(12) United States Patent
Bennett

(10) Patent No.: US 7,826,911 B1
(45) Date of Patent: Nov. 2, 2010

(54) AUTOMATIC SELECTION OF REPRESENTATIVE MEDIA CLIPS

(75) Inventor: Victor Bennett, Berkeley, CA (US)

(73) Assignee: Google Inc., Mountain View, CA (US)

( * ) Notice: Subject to any disclaimer, the term of this patent is extended or adjusted under 35 U.S.C. 154(b) by 829 days.

(21) Appl. No.: 11/289,433

(22) Filed: Nov. 30, 2005

(51) Int. Cl.
*G06F 17/00* (2006.01)
*G10H 1/18* (2006.01)

(52) U.S. Cl. .............................. 700/94; 84/600; 84/615

(58) Field of Classification Search .................. 700/94; 84/600; 704/248, 249, 250; 382/173, 212, 382/224
See application file for complete search history.

(56) References Cited

U.S. PATENT DOCUMENTS

| | | | |
|---|---|---|---|
| 6,225,546 | B1 | 5/2001 | Kraft et al. |
| 6,542,869 | B1 | 4/2003 | Foote ........................ 704/500 |
| 6,674,452 | B1 | 1/2004 | Kraft et al. |
| 6,965,546 | B2* | 11/2005 | Tagawa et al. ........... 369/30.19 |
| 7,038,118 | B1* | 5/2006 | Gimarc ........................ 84/600 |
| 7,179,982 | B2* | 2/2007 | Goto ........................... 84/616 |
| 7,232,948 | B2* | 6/2007 | Zhang ......................... 84/600 |
| 2001/0003813 | A1* | 6/2001 | Sugano et al. .............. 704/500 |
| 2004/0170392 | A1* | 9/2004 | Lu et al. ...................... 386/96 |
| 2005/0102135 | A1* | 5/2005 | Goronzy et al. ............. 704/213 |
| 2006/0080095 | A1* | 4/2006 | Pinxteren et al. ............ 704/233 |
| 2006/0212478 | A1* | 9/2006 | Plastina et al. ........... 707/104.1 |
| 2006/0288849 | A1* | 12/2006 | Peeters ........................ 84/616 |

OTHER PUBLICATIONS

Charles Fox, "Genetic Hierarchical Music Structures"; Clare College, Cambridge; May 2000; Appendix E; 4 pages.
Abdallah et al., "Theory and Evaluation of a Bayesian Music Structure Extractor", Proceedings of the Sixth International Conference on Music Information, University of London, 2005, 6 pages.
Aucouturier et al., "Segmentation of Musical Signals Using Hidden Markov Models", Proceedings of the Audio Engineering Society $110^{th}$ Convention, King's College, 2001, 8 pages.
Foote et al., "Media Segmentation using Self-Similarity Decomposition", Proceedings—SPIE The International Society for Optical Engineering, 2003, 9 pages.
Foote, "Methods for the Automatic Analysis of Music and Audio", In Multimedia Systems, 1999, 19 pages.
Goto, "A Chorus-Section Detecting Method for Musical Audio Signals", Japan Science and Technology Corporation, IEEE International Conference on Acoustics, Speech, and Signal Processing, pp. V437-440, 2003, 4 pages.

(Continued)

*Primary Examiner*—Vivian Chin
*Assistant Examiner*—Joseph Saunders, Jr.
(74) *Attorney, Agent, or Firm*—Harrity & Harrity, LLP

(57) ABSTRACT

A system determines human recognizable labels for portions of an electronic media stream, gathers data associated with the electronic media stream from a number of media players, and determines at least one section of the electronic media stream with a particular media feature. The system selects a representative clip for the electronic media stream based on information regarding the labeled portions, the gathered data, and the at least one section.

44 Claims, 14 Drawing Sheets

OTHER PUBLICATIONS

Peeters et al., "Toward Automatic Music Audio Summary Generation from Signal Analysis", Proceedings International Conference on Music Information Retrieval, 2002, 7 pages.

Visell "Spontaneous organisation, pattern models, and music", Organised Sound, 9(2), p. 151-165, 2004.

Hainsworth S., et al.: The Automated Transcription Problem; retrieved online at: http://citeseerx.ist.psu.edu/viewdoc/summary?doi=10.1.1.9.9571, 23 pages.

U.S. Appl. No. 11/289,527, filed Nov. 30, 2005 entitled "Deconstructing electronic media stream into human recognizable portions", by Victor Bennett, 31 pages, 9 pages of drawings.

* cited by examiner

FIG. 11

O SUSANNA

0:00

VERSE 1

I came from Alabama
With my banjo on my knee,
I'm goin' to Louisiana
My true love for to see;
It rained all night the day I left,
The weather it was dry;
The sun so hot I froze to death;
Susanna, don't you cry.

0:18

CHORUS

O, Susanna,
O, don't you cry for me,
I've come from Alabama
With my banjo on my knee.
O, Susanna,
O, don't you cry for me,
'Cause I'm goin' to Louisiana,
My true love for to see.

0:38

VERSE 2

I had a dream the other night
When ev'rything was still;
I thought I saw Susanna
A-comin' down the hill;
The buckwheat cake was in her mouth,
The tear was in her eye;
Says I, I'm comin' from the south,
Susanna, don't you cry.

0:58

CHORUS

O, Susanna,
O, don't you cry for me,
I've come from Alabama
With my banjo on my knee.
O, Susanna,
O, don't you cry for me,
'Cause I'm goin' to Louisiana,
My true love for to see.

1:18

VERSE 3

I soon will be in New Orleans,
And then I'll look around,
And when I find Susanna
I'll fall upon the ground.
And if I do not find her,
Then I will surely die,
And when I'm dead and buried,
Susanna, don't you cry.

1:38

CHORUS

O, Susanna,
O, don't you cry for me,
I've come from Alabama
With my banjo on my knee.
O, Susanna,
O, don't you cry for me,
'Cause I'm goin' to Louisiana,
My true love for to see.

1:58

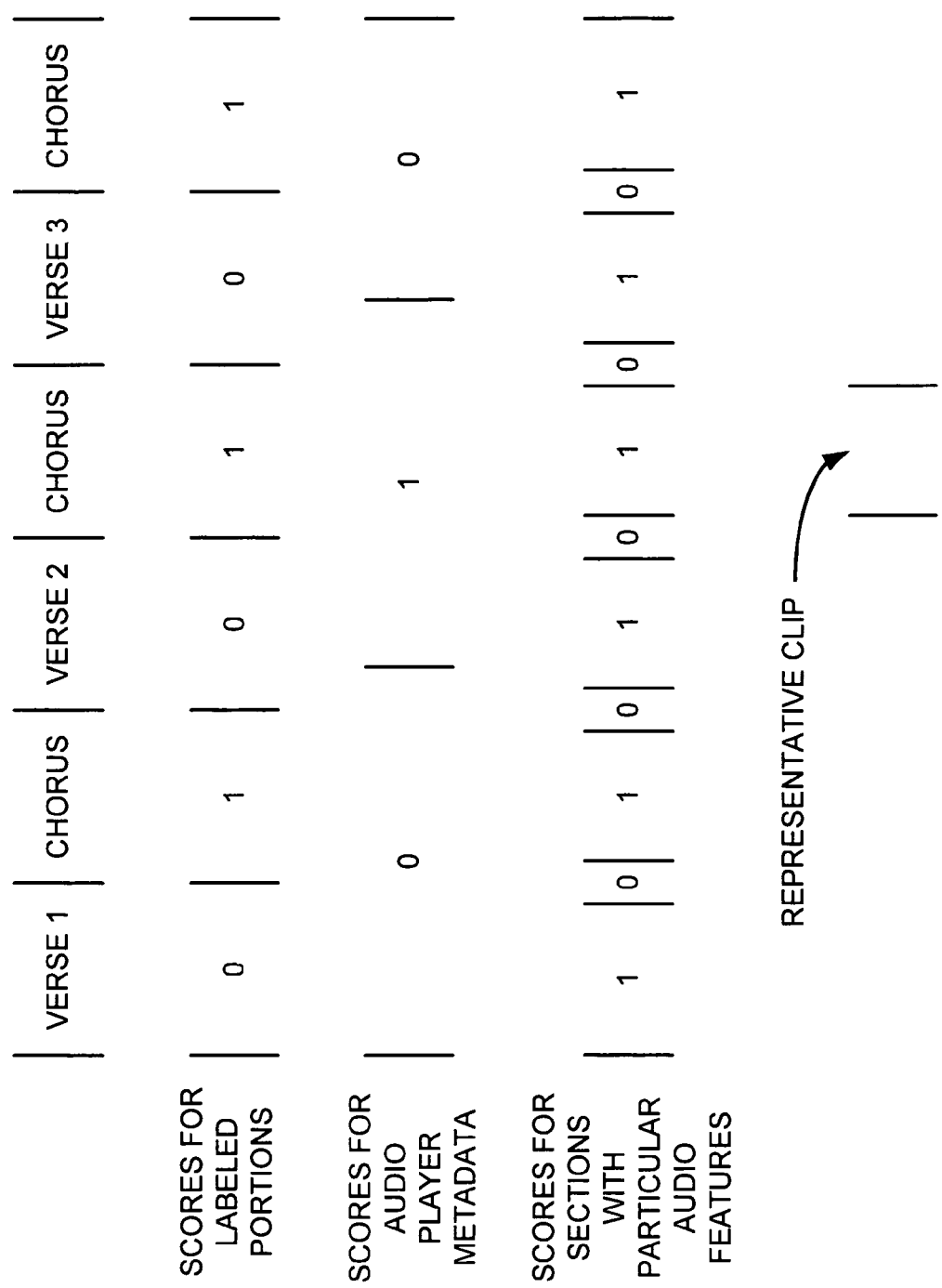

AUTOMATIC SELECTION OF REPRESENTATIVE MEDIA CLIPS

BACKGROUND

1. Field of the Invention

Implementations described herein relate generally to processing of electronic media and, more particularly, to the identification of a representative clip for the electronic media.

2. Description of Related Art

Currently, online music stores associated with providers, such as iTunes, Real Player, Windows Media Player, Amazon, Yahoo, and Napster, offer a representative clip of songs for free. The representative clip is typically about thirty seconds in length. There currently exists two methods by which the representative clip is selected.

In the first method, human operators select a representative clip from each song. The human operators identify start points for the representative clip. Given that there are multiple languages and thousands of songs released weekly, the first method scales poorly.

In the second method, rules are established for selecting the representative clip. The rules typically identify the first thirty seconds of the song. Slightly more complicated rules might start the representative clip at the first audible sound, so that silence is not included. This often means that songs with long intros or big differences between the chorus and other parts of the songs may be less appealing to potential purchasers because the representative clip does not contain the memorable portion of the songs.

SUMMARY

According to one aspect, a method may include collecting information associated with user interaction with regard to an electronic media stream and a number of media players; classifying the information as positive user actions, negative user actions, and neutral user actions with regard to the electronic media stream; and identifying a representative clip for the electronic media stream based on the classified information.

According to another aspect, a system may include a clip selector to determine human recognizable labels for portions of an electronic media stream, collect data associated with user interaction with regard to the electronic media stream and a number of media players, and select a representative clip for the electronic media stream based on information regarding the labeled portions and the collected data.

According to yet another aspect, a system may include a clip selector to collect data regarding user interaction with regard to a number of media players and the electronic media stream, identify at least one section of the electronic media stream based on a feature associated with the at least one section, and determine a representative clip for the electronic media stream based on information regarding the collected data and the at least one section.

According to a further aspect, a method may include determining human recognizable labels for portions of an electronic media stream; determining at least one section of the electronic media stream with a particular feature; and selecting a representative clip for the electronic media stream based on information regarding the labeled portions and the at least one section.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 10-14 are diagrams of an exemplary implementation consistent with the principles of the invention.

DETAILED DESCRIPTION

The following detailed description of the invention refers to the accompanying drawings. The same reference numbers in different drawings may identify the same or similar elements. Also, the following detailed description does not limit the invention.

As used herein, "electronic media" may refer to different forms of audio and video information, such as radio, sound recordings, television, video recording, and streaming Internet content. The description to follow will describe electronic media in terms of audio information, such as an audio stream or file. It should be understood that the description may equally apply to other forms of electronic media, such as video streams or files.

Overview

Figure 1:
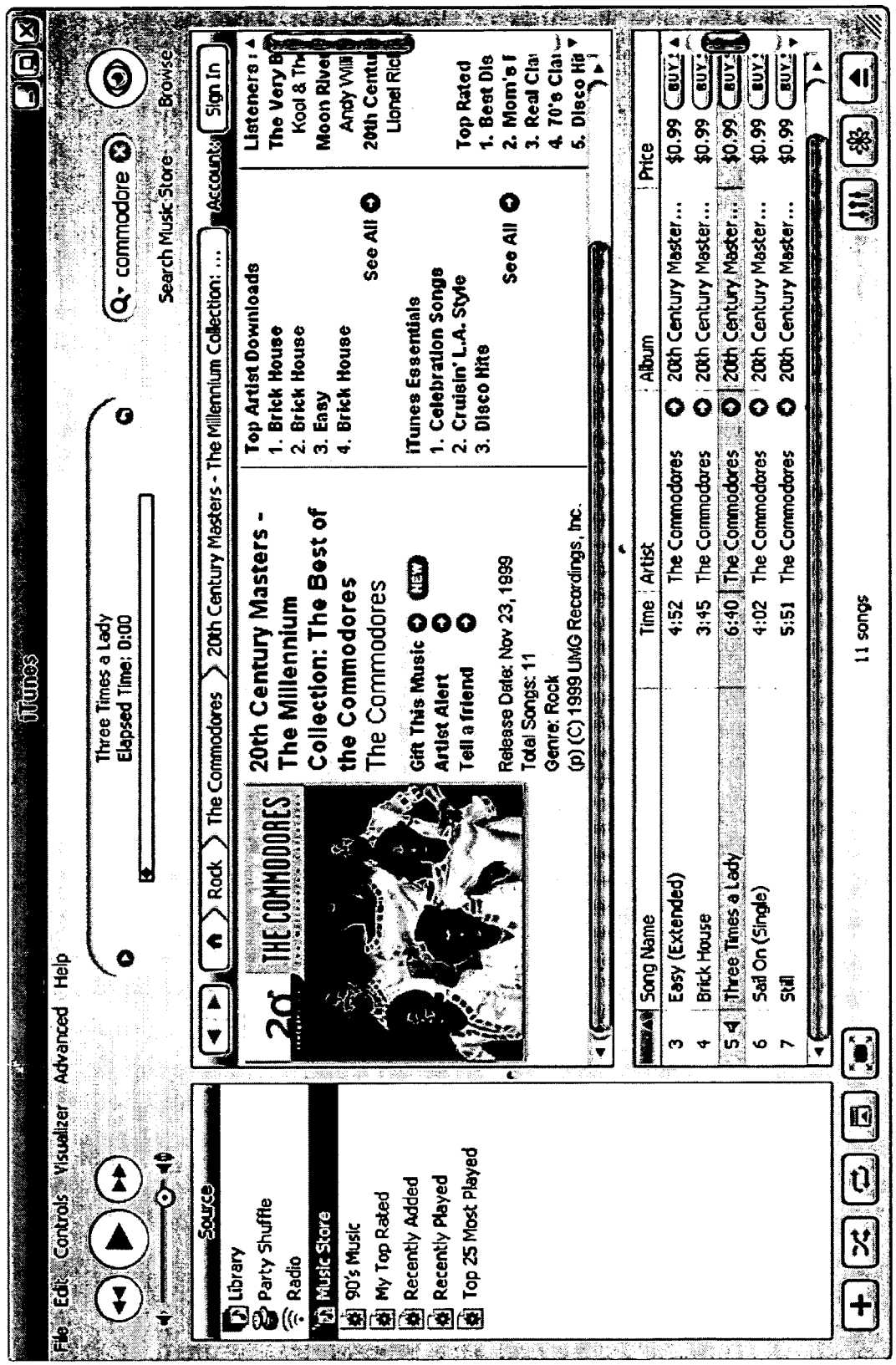
FIG. 1 illustrates a concept consistent with the principles of the invention.

FIG. 1 illustrates a concept consistent with the principles of the invention. As shown in FIG. 1, an audio player, such as iTunes, permits individuals to purchase music. A potential purchaser may initiate the audio player and proceed to the "music store" by selecting the appropriate item (e.g., link). The link may cause a web site associated with the provider of the audio player to be accessed.

Within the music store, the potential purchaser can browse and search for music. Typically, the music store may provide information regarding the music that it offers. The music store may categorize its music by genre, popularity, and/or release date, and permit access to its music by keyword searching.

As shown in FIG. 1, assume that the potential purchaser desires music associated with the Commodores. The potential purchaser can access information regarding collections (e.g., albums) of the Commodores by keyword searching or perusal of the music categories. The music store may permit the potential purchaser to listen to one or more (or all) of the songs in a collection. For example, the music store may present the potential purchaser with a list of songs associated with the collection and permit the potential purchaser to select one or more of the songs.

When the potential purchaser selects a song, the audio player may play a representative clip from the song. Implementations consistent with the principles of the invention may automatically determine which portion of the song best represents the song and, therefore, would be most likely to "sell" the song. As described in detail below, information regarding labeled portions of the song, human interaction with an audio player, and/or audio features associated with the song may help identify the audio clip (e.g., a thirty second clip) of the song that best represents the song.

Automatically selecting an audio clip that best represents a song has many uses and advantages. It may scale well to select audio clips for thousands of songs, possibly in different languages, that are typically released in any given week. The automatic clip selection may be useful for online music stores, such as those provided by Yahoo, Apple, Microsoft, Napster, Real, Amazon, and others, that permit customers to listen to a portion of a song before purchasing the song. The automatic clip selection might also be useful for traditional "brick and mortar" stores, such as Barnes and Nobel, Best Buy, Borders, Starbucks, and others, that often have listening stations to permit customers to listen to a portion of a song before purchasing the song. The automatic clip selection might further be useful for online sellers of tickets, such as Tickmaster, that may permit customers to listen to a portion of one or more songs that may be featured at a concert before purchasing a ticket to the concert. The automatic clip selection could also be useful at venues, such as concert arenas, where attendees might be able to listen to a portion of songs associated with performers.

Exemplary System

Figure 2:
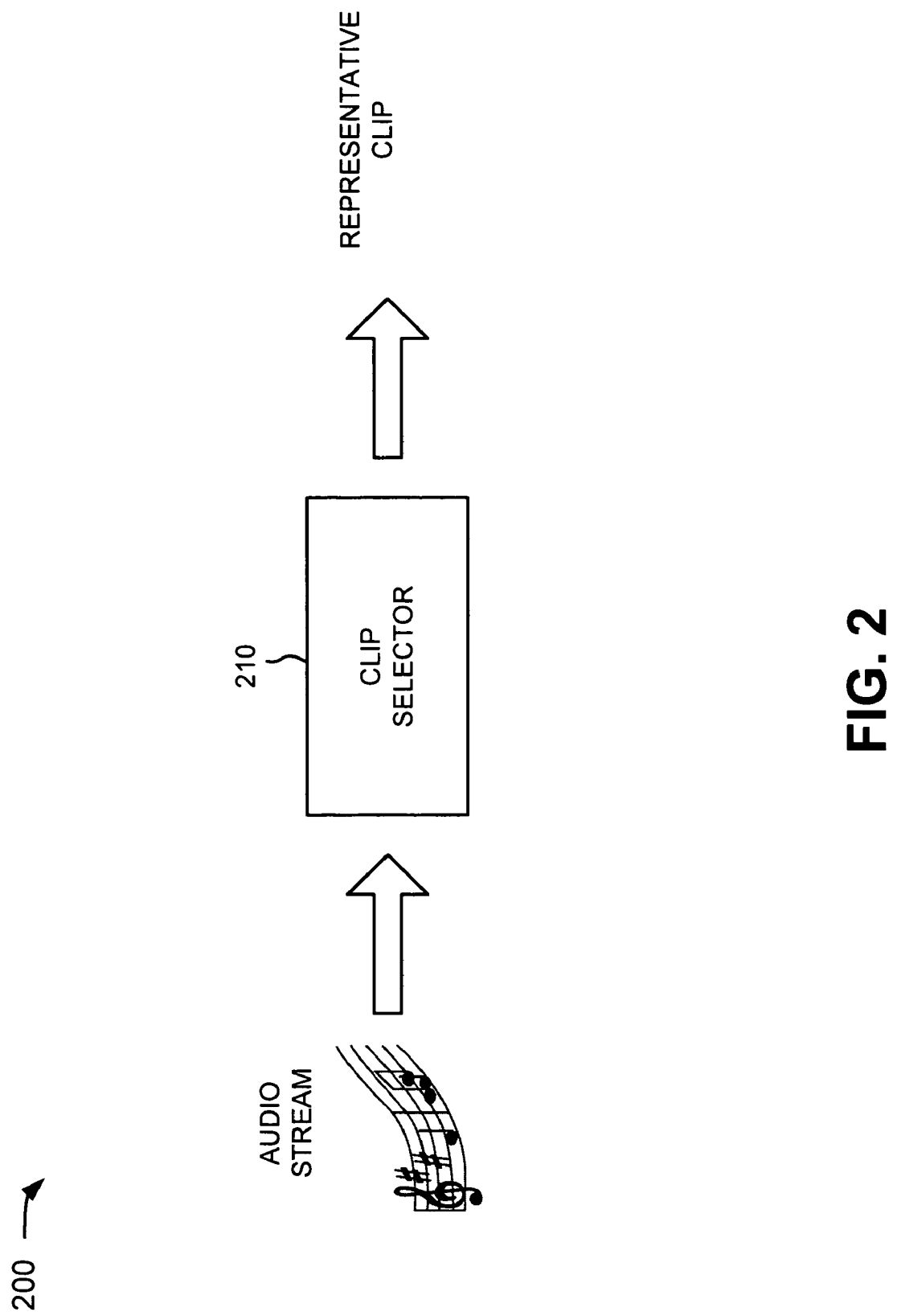
FIG. 2 is a diagram of an exemplary system in which systems and methods consistent with the principles of the invention may be implemented.

FIG. 2 is an exemplary diagram of a system 200 in which systems and methods consistent with the principles of the invention may be implemented. As shown in FIG. 2, system 200 may include clip selector 210. In one implementation, clip selector 210 is implemented as one or more devices that may each include any type of computing device capable of receiving an audio stream (from a network or file) and select a clip of the audio stream that is representative of the audio stream.

Figure 3:
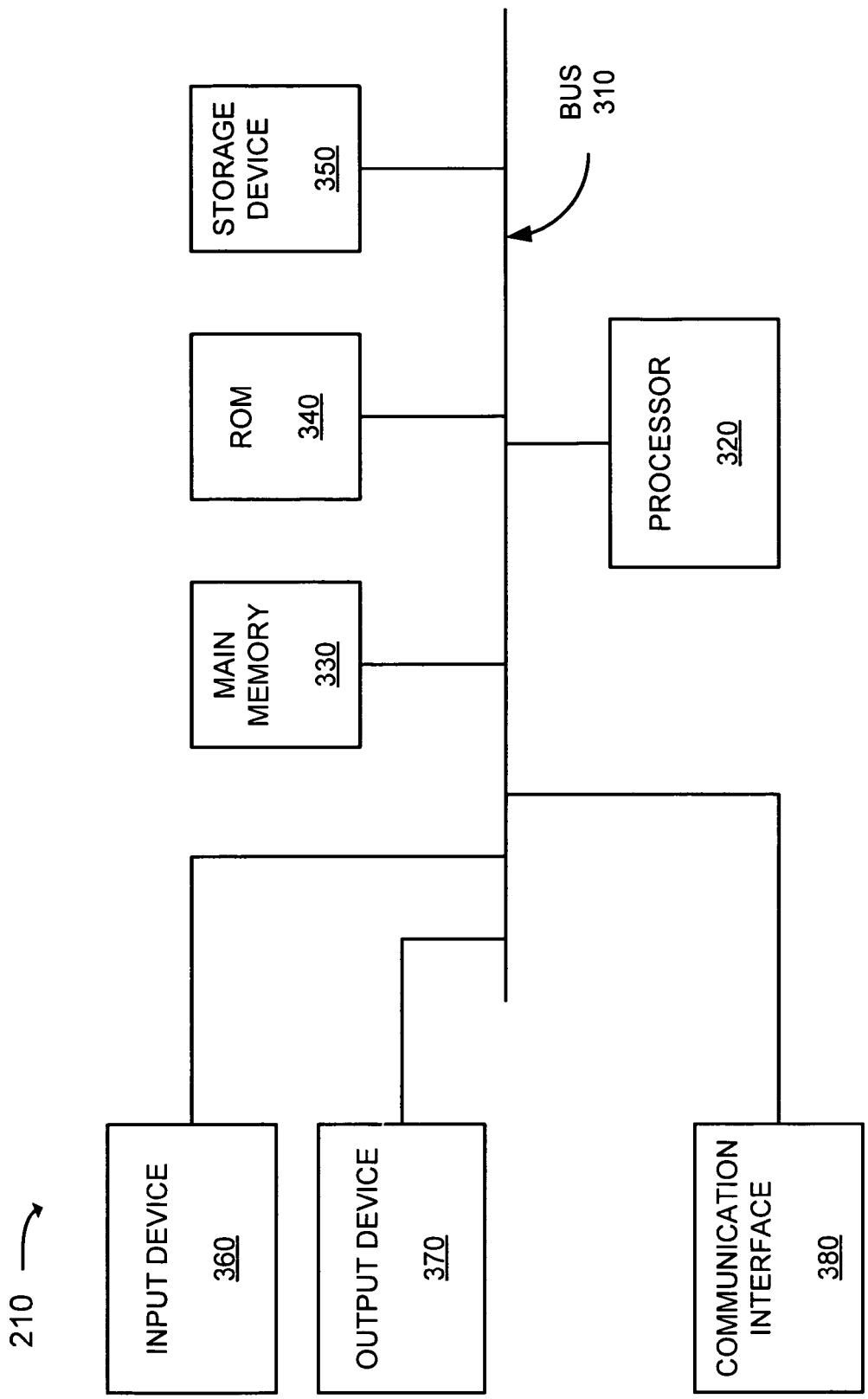
FIG. 3 is an exemplary diagram of a device that may be used to implement the clip selector of FIG. 2.

FIG. 3 is an exemplary diagram of a device 300 that may be used to implement clip selector 210. Device 300 may include a bus 310, a processor 320, a main memory 330, a read only memory (ROM) 340, a storage device 350, an input device 360, an output device 370, and a communication interface 380. Bus 310 may include a path that permits communication among the elements of device 300.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to device 300, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables device 300 to communicate with other devices and/or systems.

As will be described in detail below, clip selector 210, consistent with the principles of the invention, may perform certain audio processing-related operations. Clip selector 210 may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Figure 4:
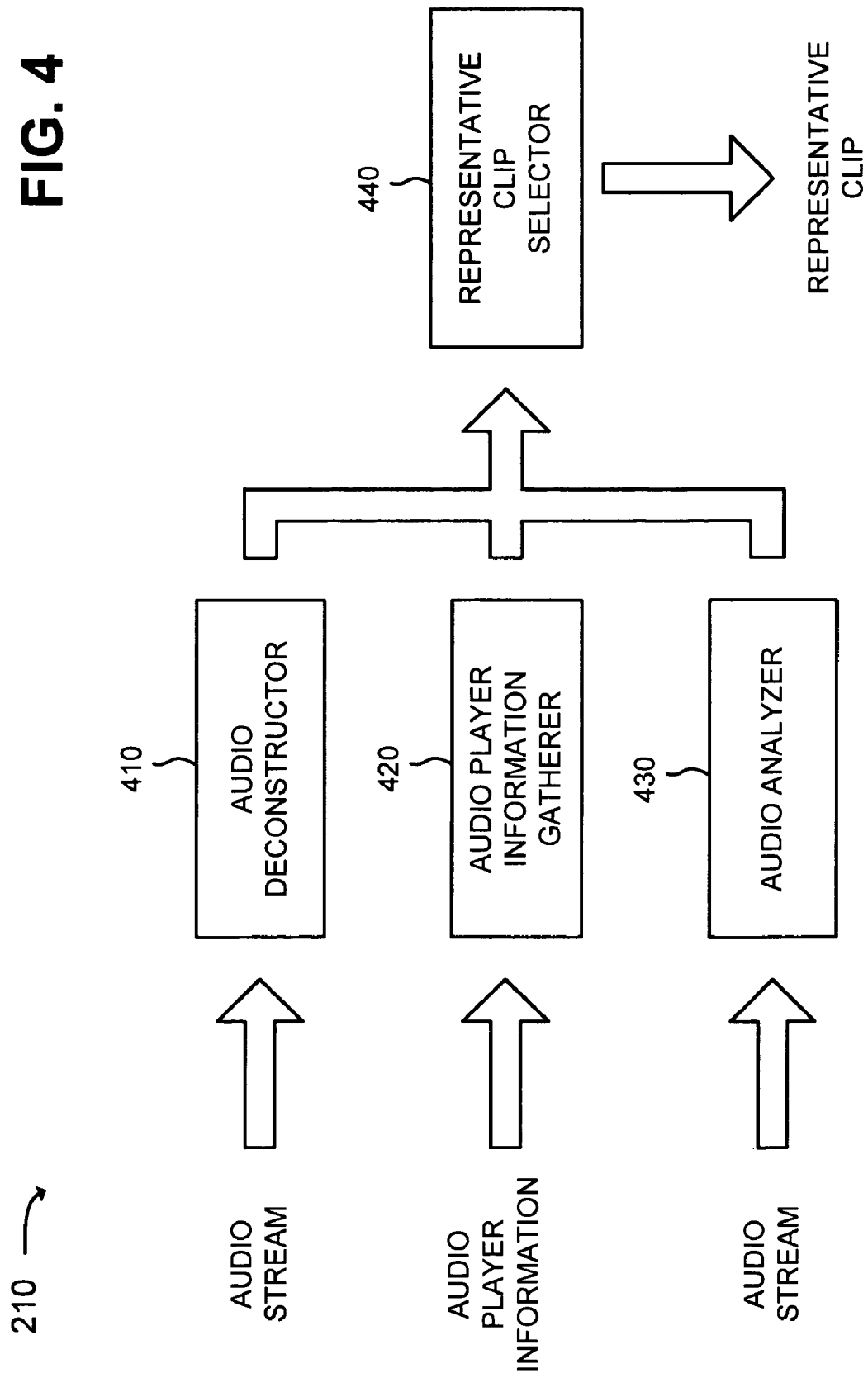
FIG. 4 is an exemplary functional diagram of the clip selector of FIG. 2.

FIG. 4 is an exemplary functional diagram of clip selector 210. Clip selector 210 may include audio deconstructor 410, audio player information gatherer 420, audio analyzer 430, and representative clip selector 440. Audio deconstructor 410 may receive an audio stream, deconstruct the audio stream into portions, and identify human recognizable labels (e.g., intro, verse, chorus, bridge, etc.) for the portions. These portions may have particular recognizable characteristics and can easily be recognized by humans. One of the benefits of determining the labeled portions of the audio stream is that the portions can assist in the selection of a representative clip. For example, the chorus of the audio stream might be the most recognizable portion of the audio stream. Therefore, it might be beneficial to include at least one instance of the chorus in the representative clip.

Audio player information gatherer 420 may gather information regarding human interaction with an audio player in connection with the audio stream. For example, audio player information gatherer 420 may aggregate information regarding user actions for a number of users and audio players. The user actions might include turning up or down the volume during the playing of an audio stream, fast forwarding over one or more parts of an audio stream, repeating the playing of one or more parts of an audio stream, and pausing the playing of an audio stream. One of the benefits of aggregating information regarding user actions is that the information can assist in the selection of a representative clip. For example, parts of the audio stream that have invoked positive actions (defined below) from users might constitute favorable part(s) of the audio stream. Therefore, it might be beneficial to include at least part of one or more of these favorable parts in the representative clip.

Audio analyzer 430 may receive the audio stream and analyze audio features associated with the audio stream. Audio analyzer 430 may analyze audio features associated with one or more frequency ranges of the audio stream to identify information that can assist in the selection of a representative clip. For example, for an audio stream that includes singing, the sections of the audio stream that include singing might be best representative of the audio stream. Therefore, it might be beneficial to include at least part of these sections in the representative clip.

Representative clip selector 440 may receive the outputs of audio deconstructor 410, audio player information gatherer 420, and audio analyzer 430 and determine, based on these outputs, which part of the audio stream would be best representative of the audio stream. Representative clip selector 440 may identify the representative clip by, for example, identifying a time code that corresponds to the start and/or end of the clip. The time code may be stored as metadata associated with the audio stream.

Audio Deconstructor

Figure 5:
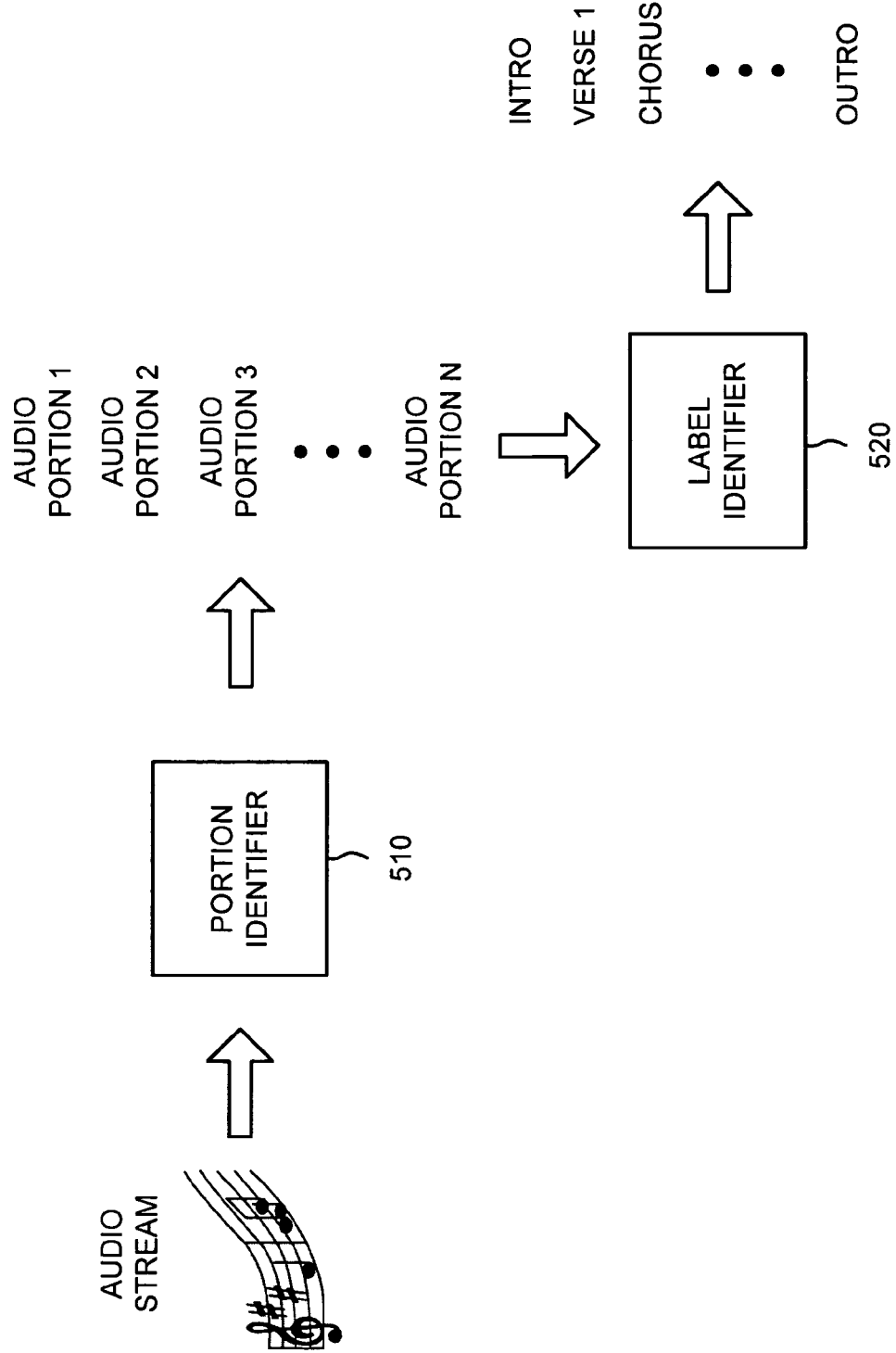
FIG. 5 is an exemplary functional diagram of the audio deconstructor of FIG. 4.

FIG. 5 is an exemplary functional diagram of audio deconstructor 410. Audio deconstructor 410 is described in copending U.S. patent application, Ser. No. 11/289,527, entitled "DECONSTRUCTING AUDIO STREAM INTO HUMAN RECOGNIZABLE PORTIONS," filed concurrently herewith, and which is incorporated herein by reference.

As shown in FIG. 5, audio deconstructor 410 may include portion identifier 510 and label identifier 520. Portion identifier 510 may receive an audio stream, such as a music file or stream, and deconstruct the audio stream into audio portions (e.g., audio portion 1, audio portion 2, audio portion 3, ..., audio portion N (where N≧2)). In one implementation, portion identifier 510 may be based on a model that uses a machine learning, statistical, or probabilistic technique to predict break points between the portions in the audio stream, which is described in more detail below. The input to the model may include the audio stream and the output of the model may include break point identifiers (e.g., time codes) relating to the beginning and end of each portion of the audio stream.

Label identifier 520 may receive the break point identifiers from portion identifier 510 and determine a label for each of the portions. In one implementation, label identifier 510 may be based on a model that uses a machine learning, statistical, or probabilistic technique to predict a label for each of the portions of the audio stream, which is described in more detail below. The input to the model may include the audio stream with its break point identifiers (which identify the portions of the audio stream) and the output of the model may include the identified portions of the audio stream with their associated labels.

Portion identifier 510 and/or label identifier 520 may be based on models. The model for portion identifier 510 may be referred to as the "portion model" and the model for label identifier 520 may be referred to as the "label model." While the portion model and the label model will be described as separate models that are trained differently, it may be possible for a single model to be trained to perform the functions of both models.

Portion Model

The training set for the portion model might include human training data and/or audio data. Human operators who are well versed in music might identify the break points between portions of a number of audio streams. For example, human operators might listen to a number of music files or streams and identify the break points among the intro, verse, chorus, bridge, and/or outro. The audio data might include a number of audio streams for which human training data is provided.

Human training data and attributes associated with the audio data may be analyzed to form a set of rules for identifying break points between portions of other audio streams. The rules may be used to form the portion model.

The audio data attributes might include volume, intensity, patterns, and/or other characteristics of the audio stream that might signify a break point. For example, a change in volume within an audio stream might be used as an indicator of a break point.

Additionally, or alternatively, a change in level (intensity) for one or more frequency ranges might be used as an indicator of a break point. An audio stream may include multiple frequency ranges associated with, for example, the human vocal frequency range and one or more frequency ranges associated with the instrumental frequencies (e.g., a bass frequency, a treble frequency, and/or one or more mid-range frequencies). Changes in a single frequency range or correlated changes in multiple frequency ranges may be used as an indicator of a break point.

Additionally, or alternatively, a change in pattern (e.g., beat pattern) might be used as an indicator of a break point. For example, a window around each instance (e.g., time point) in the audio stream (e.g., ten seconds prior to and ten second after the instance) may be analyzed to compare the beats per second in each frequency range within the window. A change in the beats per second within one or more of the frequency ranges might indicate a break point. In one implementation, changes in the beats per second might be correlated for all frequency ranges and used as an indicator of a break point.

Rules might be generated for the portion model based on one or more of the audio data attributes, such as those identified above. Any of several well known techniques may be used to generate the model, such as logic regression, boosted decision trees, random forests, support vector machines, perceptrons, and winnow learners. The portion model may determine the probability that an instance in an audio stream is the beginning (or end) of a portion based on one or more audio data attributes associated with the audio stream:

P(portion|audio attribute(s)), where "audio attribute(s)" might refer to one or more of the audio data attributes identified above.

The portion model may generate a "score," which may include a probability output and/or an output value, for each instance in the audio stream that reflects the probability that the instance is a break point. The highest scores (or scores above a threshold) may be determined to be actual break points in the audio stream. Break point identifiers (e.g., time codes) may be stored for each of the instances that are determined to be break points. Pairs of identifiers (e.g., a time code and the subsequent or preceding time code) may signify the different portions in the audio stream.

The output of the portion model may include break point identifiers (e.g., time codes) relating to the beginning and end of each portion of the audio stream.

Label Model

The training set for the label model might include human training data, audio data, and/or audio feature information. Human operators who are well versed in music might label the different portions of a number of audio streams. For example, human operators might listen to a number of music files or streams and label their different portions, such as the intros, the verses, the choruses, the bridges, and/or the outros. The human operators might also identify genres (e.g., rock, jazz, classical, etc.) with which the audio streams are associated. The audio data might include a number of audio streams for which human training data is provided along with break point identifiers (e.g., time codes) relating to the beginning and end of each portion of the audio streams. Attributes associated with an audio stream may be used to identify different portions of the audio stream. Attributes might include frequency information and/or other characteristics of the audio stream that might indicate a particular portion. Different frequencies (or frequency ranges) may be weighted differently to assist in separating those one or more frequencies that provide useful information (e.g., a vocal frequency) over those one or more frequencies that do not provide useful information (e.g., a constantly repeating bass frequency) for a particular portion or audio stream.

The audio feature information might include additional information that may assist in labeling the portions. For example, the audio feature information might include information regarding common portion labels (e.g., intro, verse, chorus, bridge, and/or outro). Additionally, or alternatively, the audio feature information might include information regarding common formats of audio streams (e.g., AABA format, verse-chorus format, etc.). Additionally, or alternatively, the audio feature information might include information regarding common genres of audio streams (e.g., rock, jazz, classical, etc.). The format and genre information, when available, might suggest a signature (e.g., arrangement of the different portions) for the audio streams. A common signature for audio streams belonging to the rock genre, for example, may include the chorus appearing once, followed by the bridge, and then followed by the chorus twice consecutively.

Attributes associated with the audio streams, the portions identified by the break points, the audio feature information, and the human training data may be analyzed to form a set of rules for labeling portions of other audio streams. The rules may be used to form the label model.

Some of the rules that may be generated for the label model might include:
- Intro: An intro portion may start at the beginning of the audible frequencies.
- Verse: A verse portion generally includes sound within the vocal frequency range. There may be multiple verses with the same or similar chord progression but slightly different lyrics. Thus, similar waveform shapes in the instrumental frequencies with different waveform shapes in the vocal frequencies may be verses.
- Bridge: A bridge portion commonly occurs within an audio stream other than at the beginning or end. Generally, a bridge is different in both chord progression and lyrics from the verses and chorus.
- Chorus: A chorus portion generally includes a portion that repeats (in both chord progression and lyrics) within the audio stream and may be differentiated from the verse in that the lyrics are generally the same between different occurrences of the chorus.
- Outro: An outro portion may include the last portion of an audio stream and generally trails off of the last chorus.

The label model may be formed using any of several well known techniques, such as logic regression, boosted decision trees, random forests, support vector machines, perceptrons, and winnow learners. The label model may determine the probability that a particular label is associated with a portion in an audio stream based on one or more attributes, audio feature information, and/or information regarding other portions associated with the audio stream:

P(label|portion, audio attribute(s), audio feature information, other portions), where "portion" may refer to the portion of the audio stream for which a label is being determined, "audio attribute(s)" may refer to one or more of the audio stream attributes identified above that are associated with the portion, "audio feature information" may refer to one or more types of audio feature information identified above, and "other portions" may refer to information (e.g., characteristics, labels, etc.) associated with other portions in the audio stream.

The label model may generate a "score," which may include a probability output and/or an output value, for a label that reflects the probability that the label is associated with a particular portion. The highest scores (or scores above a threshold) may be determined to be actual labels for the portions of the audio stream.

The output of the label model may include information regarding the portions (e.g., break point identifiers) and their associated labels. This information may be provided to representative clip selector 440 (FIG. 4).

Audio Player Information Gatherer

Figure 6:
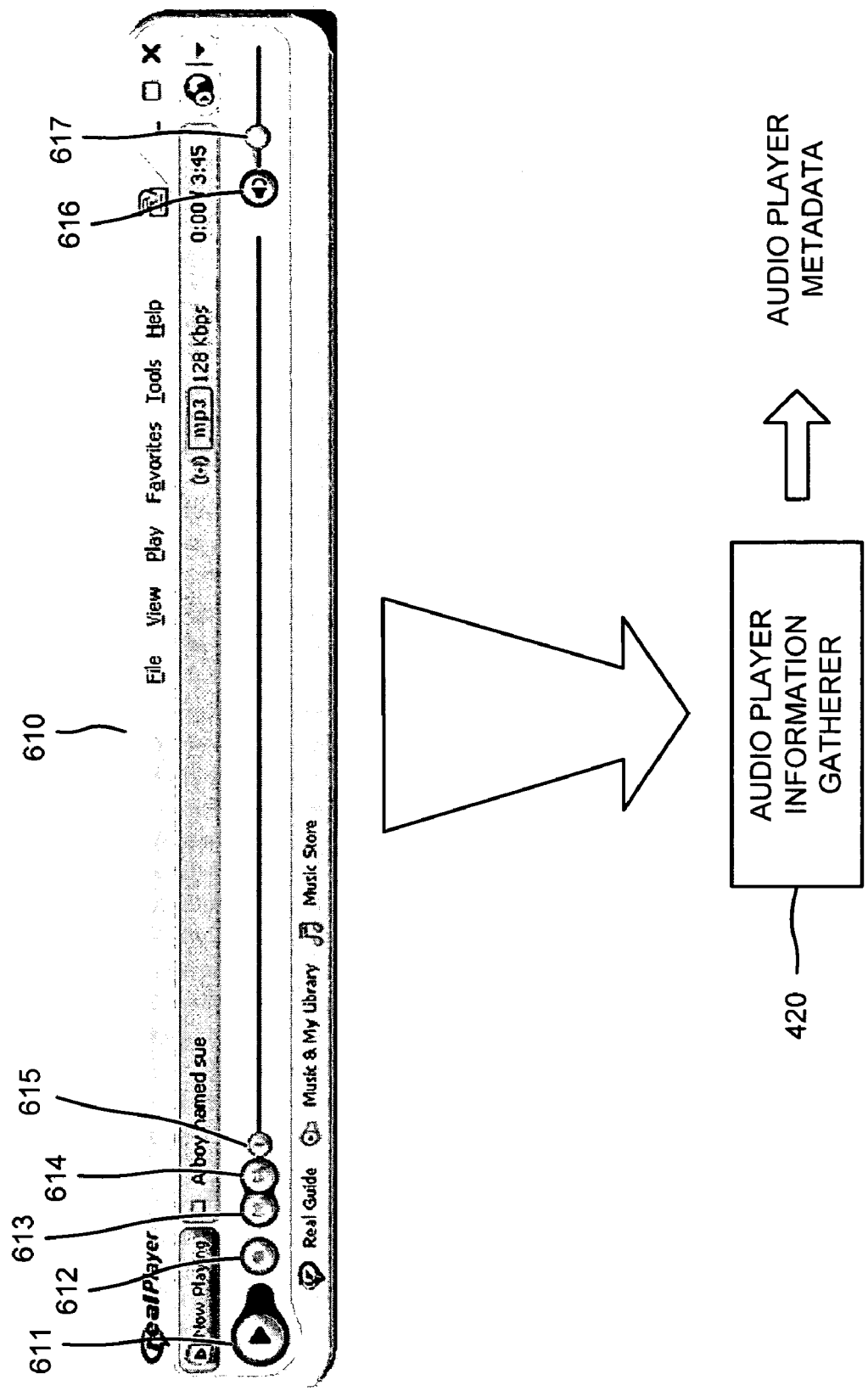
FIG. 6 is an exemplary functional diagram of the audio player information gatherer of FIG. 4.

FIG. 6 is an exemplary functional diagram of audio player information gatherer 420. As shown in FIG. 6, audio player information gatherer 420 may collect information regarding human interaction with an audio player, such as audio player 610, in connection with an audio stream.

Audio player 610 may include a play/pause button 611, stop button 612, rewind button 613, fast forward button 614, progress slider 615, mute button 616, and volume button 617. Play/pause button 611 may permit a user to play an audio stream and/or pause the playing of the audio stream. Rewind button 613 may permit the user to rewind the playing of the audio stream. Fast forward button 614 may permit the user to fast forward during playing of the audio stream. Slider 615 may provide a visual indicator of the progress of the playing of the audio stream. Slider 615 may also permit the user to fast forward and rewind during playing of the audio stream. Mute button 616 may permit the user to mute the audio during playing of the audio stream. Volume button 617 may permit the user to increase and/or decrease the volume of the audio during playing of the audio stream.

Information regarding user actions with regard to audio player 610 may be provided to audio player information gatherer 420. The user actions might include information regarding any action taken by the user during playing of an audio stream. For example, the user actions might include pausing playing of the audio stream, stopping playing of the audio stream, rewinding or fast forwarding during playing of the audio stream, muting the audio during playing of the audio stream, and/or increasing or decreasing the volume of the audio during playing of the audio stream. The information provided to audio player information gatherer 420 might identify a user action, when the user action occurred (e.g., a time code within the audio stream at which the user action occurred), and the audio stream (e.g., something that uniquely identifies the audio stream being played by the user).

While a single audio player 610 is shown in FIG. 6, audio player information gatherer 420 may collect information from a number of audio players from the same audio player provider or different audio player providers. For example, audio player information gatherer 420 may be affiliated with one or more audio player providers and the audio players of the one or more audio player providers (or the one or more audio player providers themselves) may send information to audio player information gatherer 420 (or some other component or memory associated with audio player information gatherer 420).

Alternatively, software may be installed on a client device to monitor user interaction with one or more audio players. The software may take the form of executable code, such as a plug-in, an applet, a dynamic link library (DLL), or a similar type of executable object or process. The software may identify user actions associated with an audio player and provide information to audio player information gatherer 420 (or some other component or memory associated with audio player information gatherer 420).

Audio player information gatherer 420 may classify each of the user actions as positive, negative, or neutral, which may reflect how the user felt about what the user was hearing. A positive action might include turning up the volume during playing of the audio stream or replaying a part of the audio stream, which may reflect that the user likes a certain part of the audio stream. A negative action might include fast forwarding, hovering over the fast forward button, or turning down the volume during playing of the audio stream, which may reflect that the user dislikes a certain part of the audio stream. A neutral action might include pausing the playing of the audio stream or muting the audio associated with the audio stream, which may reflect nothing about the user's feelings with regard to the audio stream.

Audio player information gatherer 420 may combine the user action information from the audio players in some manner and output information regarding positive, negative, and/or neutral actions as audio player metadata to representative clip selector 440.

Audio Analyzer

Figure 7:
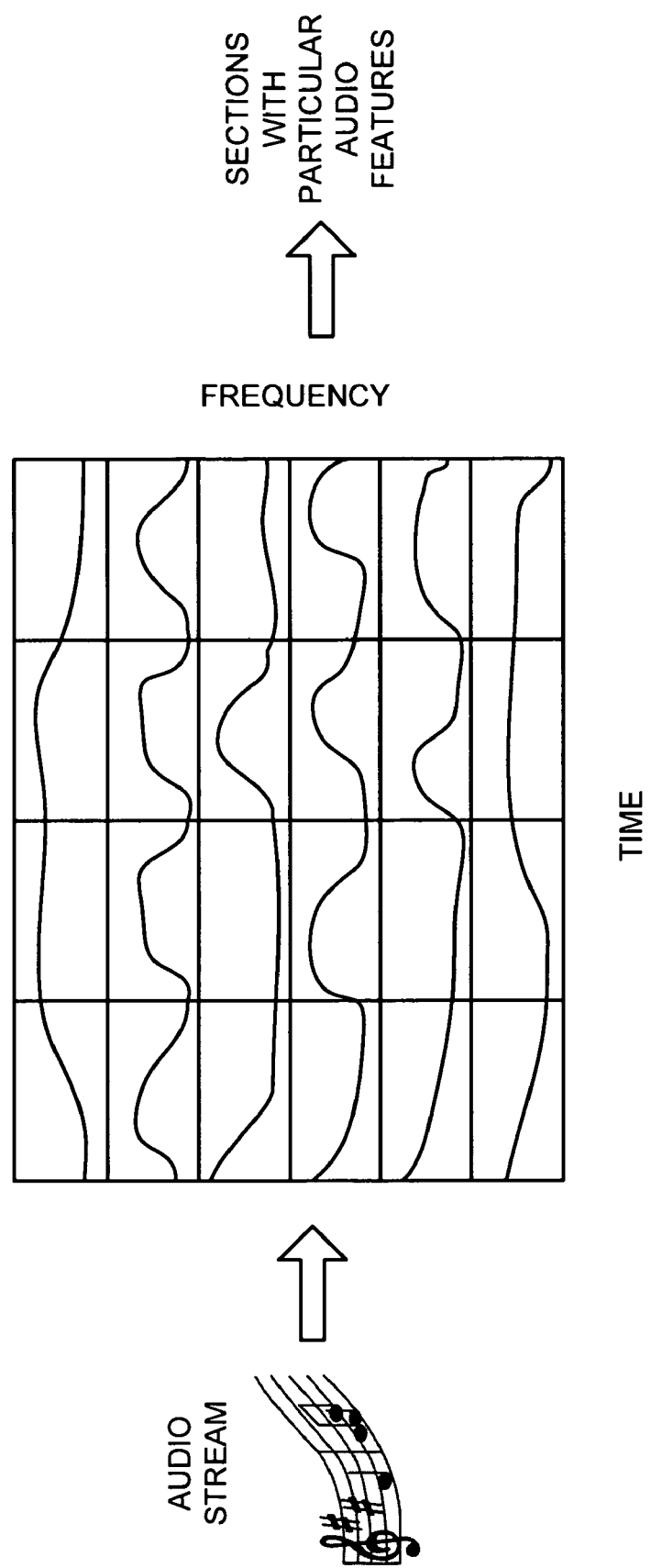
FIG. 7 is an exemplary functional diagram of the audio analyzer of FIG. 4.

FIG. 7 is an exemplary functional diagram of audio analyzer 430. As shown in FIG. 7, audio analyzer 430 may receive an audio stream and divide the audio stream into a number of frequency ranges. The particular number of frequency ranges that the audio stream is divided into is unimportant, though at least one of the frequency ranges may correspond to the human vocal range or a frequency range corresponding to one or more musical instruments. Alternatively, audio analyzer 430 may isolate one or more frequency ranges, where at least one of the frequency ranges may correspond to the human vocal range or a frequency range corresponding to one or more musical instruments.

Audio analyzer 430 may analyze audio features, such as levels (intensity), associated with one or more of the frequency ranges. In one implementation, audio analyzer 430 may identify certain sections of the audio stream that have particular audio features. For example, audio analyzer 430 may determine the sections of the audio stream that include particular levels (e.g., levels above a threshold) in the human vocal range (for an audio stream that includes singing). Audio analyzer 430 may use time codes to identify the sections of the audio stream that have particular audio features.

Audio analyzer 430 may output information regarding the sections that have particular audio features, such as time codes associated with the sections, to representative clip selector 440.

Representative Clip Selector

Figure 8:
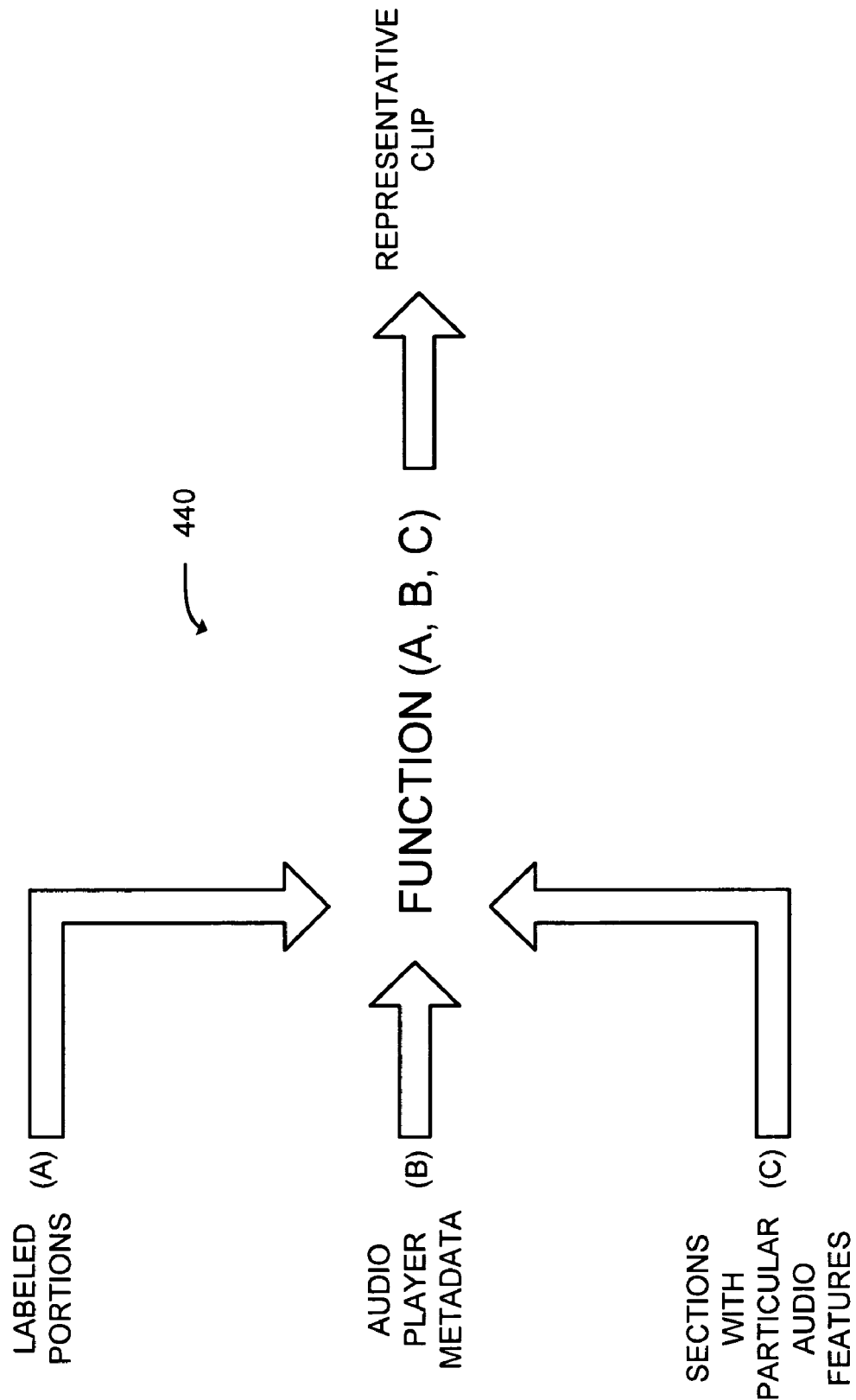
FIG. 8 is an exemplary functional diagram of the representative clip selector of FIG. 4.

FIG. 8 is an exemplary functional diagram of representative clip selector 440. As shown in FIG. 8, representative clip selector 440 may receive information regarding labeled portions from audio deconstructor 410, audio player metadata from audio player information gatherer 420, and information regarding sections with particular audio features from audio analyzer 430. Representative clip selector 440 may use this information as inputs to a function that determines a representative clip for an audio stream.

In one implementation, representative clip selector 440 may score the information that it obtains from audio deconstructor 410, audio player information gatherer 420, and audio analyzer 430. With respect to the information regarding labeled portions, representative clip selector 440 may score certain portions identified by audio deconstructor 410 higher than other portions of the audio stream. For example, representative clip selector 440 may score the chorus portion higher than other portions of the audio stream because the chorus portion typically contains the most memorable part of an audio stream. In a simple scoring scheme, representative clip selector 440 may assign a score of one to the chorus portions and a score of zero or some other value between zero and one to the other portions (e.g., intro, outro, verses, bridge, etc.).

With respect to the audio player metadata, representative clip selector 440 may score the parts of the audio stream that have positive associated audio player metadata higher than the parts of the audio stream that have negative or neutral associated audio player metadata because the parts with positive associated audio player metadata may be inferred to be favorable parts of the audio stream because they invoked positive actions. In a simple scoring scheme, representative clip selector 440 may assign a score of one to the parts that have positive associated audio player metadata and a score of zero or some other value between zero and one to the other parts (e.g., the parts that have negative or neutral associated audio player metadata).

With respect to the information regarding the sections with particular audio features, representative clip selector 440 may score the sections of the audio stream that have particular audio features higher than other sections of the audio stream because the sections that have particular audio features might better represent the audio stream. In a simple scoring scheme, representative clip selector 440 may assign a score of one to the sections that have particular audio features and a score of zero or some other value between zero and one to the other sections of the audio stream.

Representative clip selector 440 may input these scores into a function that may combine the scores in some manner. The output of the function might identify a piece of the audio stream to include in the representative clip. For example, the function may combine the scores and identify the piece of the audio stream that obtains the highest total score. If the identified piece is greater than the size of the representative clip (e.g., thirty seconds), then a subset of the identified piece may be used. If the identified piece is smaller than the size of the representative clip, then the representative clip may be selected to begin with, end with, or otherwise contain the identified piece.

The description above described simple scoring schemes and a simple function that combined the scores to identify the representative clip. In other implementations, more complex scoring schemes and/or functions may be used to determine the representative clip for the audio stream.

Exemplary Processing

Figure 9:
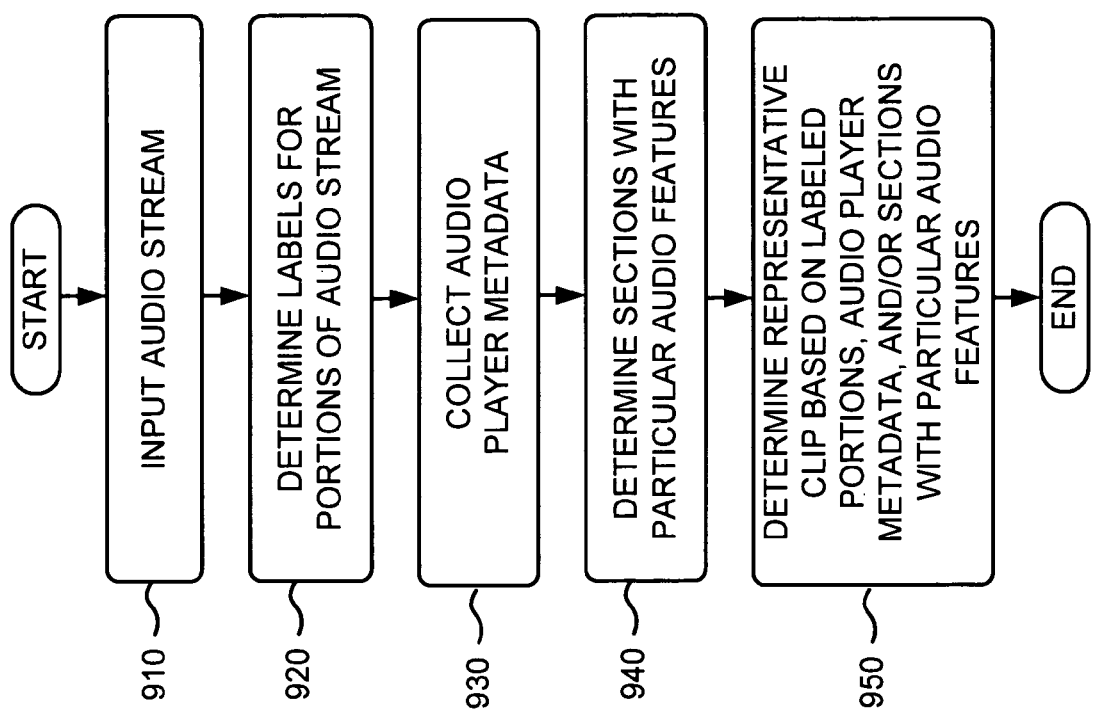
FIG. 9 is a flowchart of exemplary processing for selecting a representative clip according to an implementation consistent with the principles of the invention.

FIG. 9 is a flowchart of exemplary processing for selecting a representative clip according to an implementation consistent with the principles of the invention. Processing may begin with the inputting of an audio stream into clip selector 210 (block 910). The audio stream might correspond to a music file or stream and may be one of many audio streams to be processed by clip selector 210. The inputting of the audio stream may correspond to selection of a next audio stream from a set of stored audio streams for processing by clip selector 210.

The audio stream may be processed to identify portions of the audio stream and labels for the identified portions (block 920). In one implementation, the audio stream may be input into a portion model that is trained to identify the different portions of the audio stream with high probability. For example, the portion model may identify the break points between the different portions of the audio stream based on the attributes associated with the audio stream. The break points may identify where the different portions start and end. Human recognizable labels may be identified for each of the identified portions. In one implementation, the audio stream, information regarding the break points, and possibly audio feature information (e.g., genre, format, etc.) may be input into a label model that is trained to identify labels for the different portions of the audio stream with high probability. For example, the label model may analyze the instrumental and vocal frequencies associated with the different portions and relationships between the different portions to determine the appropriate labels.

Audio player metadata may be collected (block 930). For example, information regarding user interaction with one or more types of audio players may be gathered. Data particular to the audio stream may be classified as positive, negative, and/or neutral based on the particular actions taken by the user(s).

The audio stream may also be analyzed to determine sections of the audio stream that have particular audio features (block 940). For example, audio features may be analyzed with regard to one or more frequency ranges of the audio stream. Those sections of the audio stream that have audio features that match or exceed some criteria in one or more of the frequency ranges may be identified.

A representative clip may be identified based on the labeled portions, the audio player metadata, and/or the sections with particular audio features (block 950). For example, information regarding the labeled portions, the audio player metadata, and the sections with particular audio features may be input to a function that identifies a piece of the audio stream that is best representative of the audio stream.

Example

Figure 10:
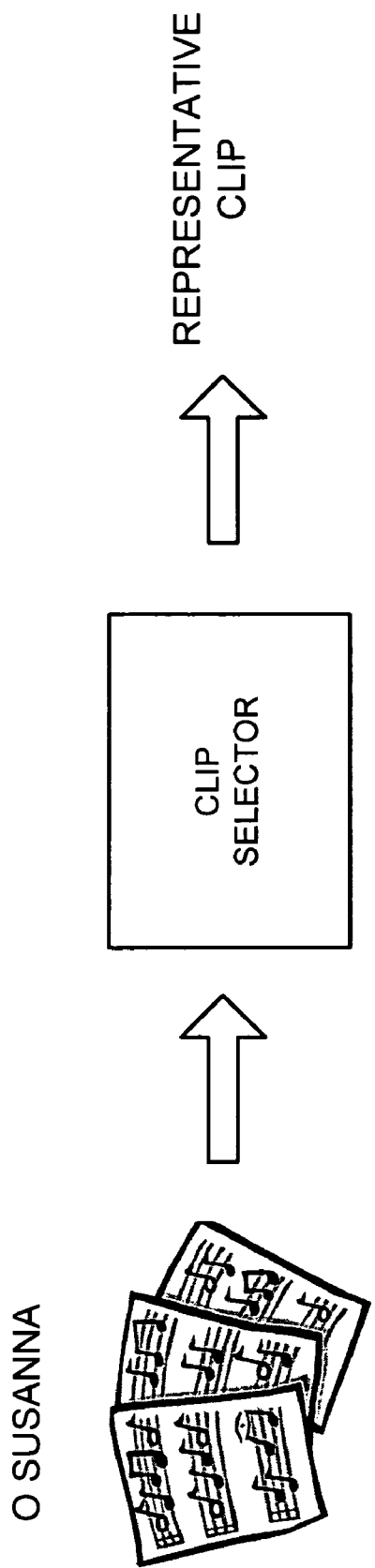

FIGS. 10-14 are diagrams of an exemplary implementation consistent with the principles of the invention. As shown in FIG. 10, assume that the clip selector receives the song "O Susanna." The clip selector may identify a representative clip for the song.

The clip selector may identify break points between portions of the song based on attributes associated with the song and identify labels associated with the portions. As shown in FIG. 11, assume that the clip selector identifies break points with high probability at time codes 0:18, 0:38, 0:58, 1:18, 1:38, and 1:58, and determines that a first portion that occurs between 0:00 and 0:18 is verse 1, a second portion that occurs between 0:18 and 0:38 is the chorus, a third portion that occurs between 0:38 and 0:58 is verse 2, a fourth portion that occurs between 0:58 and 1:18 is the chorus, a fifth portion that occurs between 1:18 and 1:38 is verse 3, and a sixth portion that occurs after 1:38 until the end of the song at 1:58 is the chorus.

Figure 12:
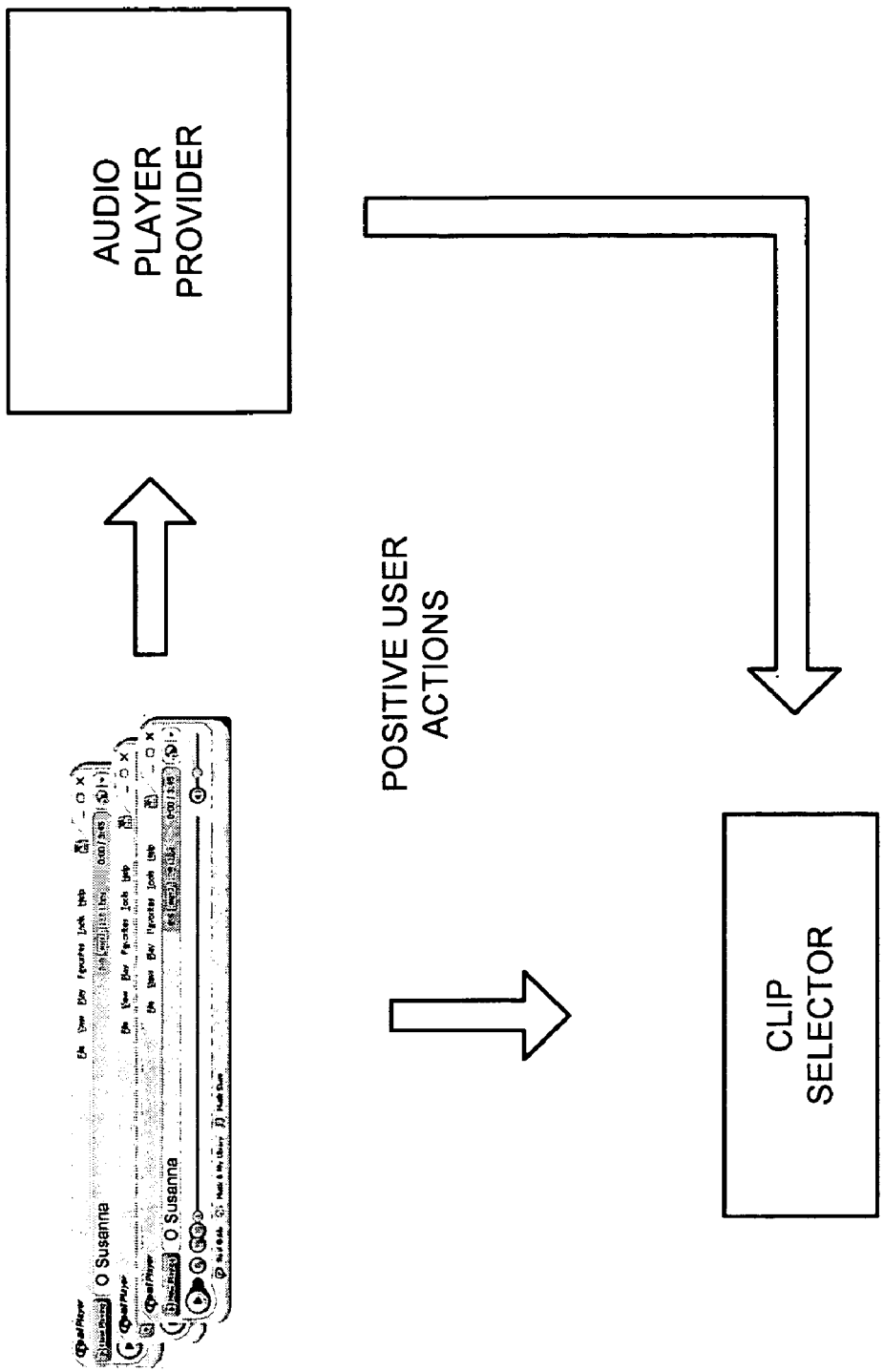

As shown in FIG. 12, the clip selector may gather information (i.e., audio player metadata) concerning positive user actions (and possibly negative and neutral user actions) with regard to the playing of the song on one or more audio players. The clip selector may obtain the information directly from the one or more audio players. Alternatively, the clip selector may obtain the information from an audio player provider that may accumulate such information.

Figure 13:
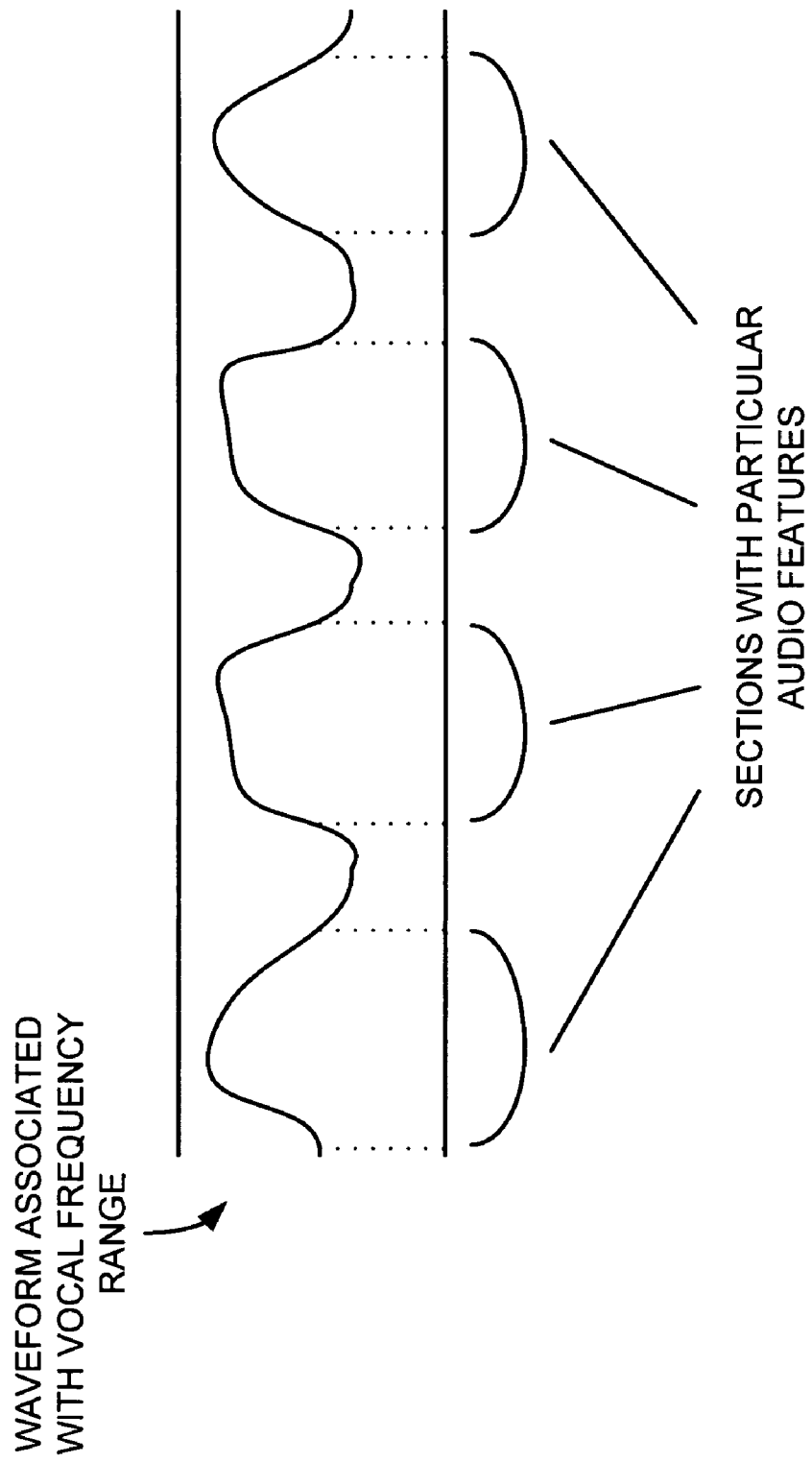

As shown in FIG. 13, the clip selector may analyze audio features associated with the song to identify sections of the song that have particular audio features in one or more frequency ranges. For example, the song may be divided into frequency ranges or one or more frequency ranges may be isolated within the song. Assume that the clip selector isolates a frequency range corresponding to the human vocal range, as shown in FIG. 13. The clip selector may then determine those sections of the song that have particular audio features in the human vocal range. For example, the clip selector may identify sections that have singing, which may be reflected in the waveforms associated with the human vocal range.

As shown in FIG. 14, the clip selector may assign scores to the different data generated/collected above. For the labeled portions, the clip selector may assign a score of one to the chorus portions and a score of zero to the other portions. For the audio player metadata, the clip selector may assign a score of one to parts of the song that are associated with positive user actions and a score of zero to the other parts. For the sections with particular audio features, the clip selector may assign a score of one to the sections identified as having the particular audio features and a score of zero to the other sections. The clip selector may then combine the scores in some manner to identify a representative clip.

As shown in FIG. 14, the clip selector identified a piece of the song that obtained a highest combined score for the representative clip. While FIG. 14 shows a single piece of the song as obtaining the highest score, it may be possible for different pieces of the audio stream to obtain the same highest score. In this case, the clip selector may simply pick one of them for the representative clip.

Conclusion

Implementations consistent with the principles of the invention may automatically determine which piece of electronic media may best represent the electronic media and, therefore, would be most likely to "sell" the electronic media.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 9, the order of the acts may be modified in other implementations consistent with the principles of the invention. Further, non-dependent acts may be performed in parallel.

While the preceding description focused on identifying a representative clip for an audio stream, the description may equally apply to the identification of representative clips for other forms of electronic media, such as video streams. For example, representative clips could be selected from a movie by choosing the genre and selecting a genre appropriate clip. For an action movie, for example, a representative clip might be selected based on the percentage of pixels that change from the last frame (e.g., that may signal motion and action), the tempo of the background music, and/or one or more portions identified by a model of a deconstructor. In this case, the model may be trained based on human training data by which human operators may select scenes that are the funniest, most drama-filled, most action-filled, etc. The model may learn what factors are shared by those scenes to identify similar scenes in other movies. For a drama movie, a representative clip might be selected based on background music that includes minor chords (e.g., that may be representative of sad music) and/or one or more portions identified by the model of the deconstructor. For a comedy movie, a representative clip might be selected based on background music that includes major chords (e.g., that may be representative of happy music) and/or one or more portions identified by the model of the deconstructor.

Also, it has been described that a representative clip is determined based on information regarding labeled portions, electronic media player metadata, and information regarding sections with particular electronic media features. In other implementations, a representative clip may be determined based on information regarding labeled portions alone, electronic media player metadata alone, or information regarding sections with particular electronic media features alone, or any combination thereof.

Further, terms, such as "portion," "part," "section," and "piece," have been used to identify a subset of an electronic media stream. It should be understood that any of these terms may refer to any subset of the electronic media stream, which is less than the entire electronic media stream.

Moreover, the term "stream" has been used in the description above. The term is intended to mean any form of data whether embodied in a carrier wave or stored as a file in memory.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a clip selector that includes an audio deconstructor, an audio information gatherer, an audio analyzer, and a representative clip selector, the method comprising:
   receiving, by the audio deconstructor, an audio stream;
   determining, by the audio deconstructor, human recognizable labels for portions of the audio stream, where determining the human recognizable labels includes:
      generating, by the audio deconstructor, a score for each of the labels, where the score is indicative of a probability that a label, associated with a particular one of the portions of the audio stream, is an actual label for the particular one of the portions, and
      selecting, by the audio deconstructor, one of the labels as the actual label for the particular one of the portions of the audio stream based on the score for the one of the labels;
   gathering, by the audio information gatherer, data associated with human interaction with the audio stream via a plurality of audio players;
   analyzing, by the audio analyzer, audio features associated with the audio stream;
   identifying, by the audio analyzer, at least one section of the audio stream with a particular audio feature of the analyzed audio features;
   receiving, by the representative clip selector, information regarding the portions of the audio stream with the human recognizable labels from the audio deconstructor, information regarding the data associated with human interaction with the audio stream from the audio information gatherer, and information regarding the at least one section from the audio analyzer; and
   selecting, by the representative clip selector, a representative clip for the audio stream based on the information regarding the portions of the audio stream with the human recognizable labels, the information regarding the data associated with human interaction with the audio stream, and the information regarding the at least one section.

2. The method of claim 1, where determining the human recognizable labels for the portions of the audio stream includes:
   training a model to identify portions of audio streams based on attributes of the audio streams,
   inputting the audio stream into the model,
   identifying, based on an output of the model, the portions of the audio stream, and
   determining the human recognizable labels for the identified portions.

3. The method of claim 1, where determining the human recognizable labels for the portions of the audio stream includes:
   training a model to identify human recognizable labels for portions of audio streams based on at least one of attributes of the audio streams, audio feature information associated with the audio streams, or information regarding other portions within the audio streams,
   identifying the portions of the audio stream,
   inputting the audio stream and information regarding the identified portions into the model, and
   determining, based on an output of the model, the human recognizable labels for the identified portions.

4. The method of claim 1, where gathering the data associated with human interaction with the audio stream includes:
   classifying the human interaction as at least one of positive actions, negative actions, or neutral actions.

5. The method of claim 4, where the positive actions include at least one of turning up a volume during playing of the audio stream or replaying part of the audio stream.

6. The method of claim 4, where the negative actions include at least one of fast forwarding the audio stream or turning down a volume during playing of the audio stream.

7. The method of claim 4, where the neutral actions include at least one of pausing playing of the audio stream or muting audio during playing of the audio stream.

8. The method of claim 1, where the data, associated with human interaction with the audio stream, identifies a user action and when the user action occurred.

9. The method of claim 1, where the audio players are associated with a single audio player provider.

10. The method of claim 1, where the audio players are associated with a plurality of audio player providers that are unaffiliated with each other.

11. The method of claim 1, where gathering the data associated with human interaction with the audio stream includes:
   obtaining the data from an audio player provider associated with the audio players.

12. The method of claim 1, where analyzing the audio features associated with the audio stream and identifying the at least one section of the audio stream include:
   identifying one or more frequency ranges associated with the audio stream,
   analyzing waveforms associated with the one or more frequency ranges, and
   identifying the at least one section of the audio stream in which the particular audio feature exists based on the analyzed waveforms.

13. The method of claim 1, where selecting the representative clip for the audio stream includes:

assigning final scores to the portions of the audio stream with the human recognizable labels, the data associated with human interaction with the audio stream, and the at least one section, and combining the final scores to identify the representative clip for the audio stream.

14. The method of claim 1, where selecting the representative clip for the audio stream includes:

inputting the information regarding the portions of the audio stream with the human recognizable labels, the information regarding the data associated with human interaction with the audio stream, and the information regarding the at least one section into a function, and outputting, by the function, information regarding the representative clip.

15. The method of claim 1, where selecting, by the representative clip selector, a representative clip for the audio stream comprises:

selecting a subset of a particular clip of the audio stream as the representative clip for the audio stream if the representative clip selector determines that the size of the particular clip is greater than a predetermined size, and selecting the particular clip as a beginning portion or an end portion of the representative clip if the representative clip selector determines that the size of the particular clip is less than the predetermined size.

16. A clip selector, comprising:

means for receiving an electronic media stream;

means for identifying portions of the electronic media stream;

means for determining human recognizable labels for the portions of the electronic media stream, where the means for determining the human recognizable labels includes:

means for generating scores for the labels, where a score, generated for a particular label associated with a particular portion, of the portions of the electronic media stream, is indicative of a probability that the particular label is an actual label for the particular portion, and means for selecting the particular label as the actual label for the particular portion based on the score;

means for gathering data, associated with user interaction with the electronic media stream, from a plurality of media players;

means for determining at least one section of the electronic media stream with a particular media feature; and means for selecting a representative clip for the electronic media stream based on information regarding the labeled portions, the gathered data, and the at least one section.

17. The clip selector of claim 16, where the means for gathering the data associated with user interaction with the electronic media stream includes:

means for collecting information associated with user interaction with regard to the electronic media stream from a plurality of users via the plurality of media players, and means for classifying the information as positive user actions, negative user actions, or neutral user actions with regard to the electronic media stream.

18. The clip selector of claim 17, where the positive user actions include at least one of turning up a volume during playing of the electronic media stream or replaying part of the electronic media stream.

19. The clip selector of claim 17, where the negative user actions include at least one of fast forwarding the electronic media stream or turning down a volume during playing of the electronic media stream.

20. The clip selector of claim 17, where the neutral user actions include at least one of pausing playing of the electronic media stream or muting audio during playing of the electronic media stream.

21. The clip selector of claim 17, where the collected information identifies a user action and when the user action occurred.

22. The clip selector of claim 16, where the plurality of media players are associated with a single media player provider.

23. The clip selector of claim 16, where the plurality of media players are associated with a plurality of media player providers that are unaffiliated with each other.

24. A system, comprising:

a clip selector to:

receive an audio stream, identify a plurality of attributes associated with the audio stream, identify portions of the audio stream based on attributes associated with the audio stream, collect data regarding user interaction with regard to a plurality of audio players and the audio stream, identify at least one section of the audio stream that has a particular audio feature, generate scores for the identified portions of the audio stream, a score for the collected data regarding the user interaction, and at least one score for the identified at least one section of the audio stream that has the particular audio feature, combine the generated scores to obtain total scores for a plurality of sections of the audio stream, identify a particular section, of the plurality of sections of the audio stream, having a highest total score of the obtained total scores, and determine a representative clip for the audio stream based on the identified particular section, the determined representative clip including at least a portion of the identified particular section.

25. The system of claim 24, where the clip selector is further to:

determine human recognizable labels for the portions of the audio stream.

26. The system of claim 25, where, when determining the human recognizable labels for the portions of the audio stream, the clip selector is to:

train a model to identify human recognizable labels for portions of audio streams based on at least one of attributes of the audio streams, feature information associated with the audio streams, or information regarding other portions within the audio streams, input the audio stream and information regarding the identified portions into the model, and determine, based on an output of the model, the human recognizable labels for the identified portions.

27. The system of claim 24, where, when identifying the portions of the audio stream, the clip selector is to:

train a model to identify portions of audio streams based on attributes of the audio streams, input the audio stream into the model, and identify, based on an output of the model, the portions of the audio stream.

28. The system of claim 24, where the clip selector is further to:

classify the user interaction as at least one of positive user actions, negative user actions, or neutral user actions.

29. The system of claim 24, where, when identifying the at least one section of the audio stream, the clip selector is to:
identify one or more frequency ranges associated with the audio stream,
analyze waveforms associated with the one or more frequency ranges, and
determine the at least one section of the audio stream in which the audio feature exists based on the analyzed waveforms.

30. A computer-readable memory device containing instructions executable by a processor, the computer-readable memory device comprising:
one or more instructions to receive an electronic media stream;
one or more instructions to identify a plurality of attributes associated with the electronic media stream;
one or more instructions to determine, based on the plurality of attributes and information regarding a plurality of previously-analyzed electronic media streams, for each of a plurality of instances in the electronic media stream, a probability that the instance is a beginning or an ending of a portion of the electronic media stream;
one or more instructions to identify the portions of the electronic media stream based on the determined probabilities;
one or more instructions to gather data associated with user interaction with the electronic media stream via a plurality of media players;
one or more instructions to analyze features associated with the electronic media stream;
one or more instructions to identify at least one section of the electronic media stream with a particular feature of the analyzed features;
one or more instructions to generate scores for the identified portions of the electronic media stream, the gathered data associated with user interaction, and the identified at least one section of the electronic media stream with the particular feature;
one or more instructions to combine the generated scores to obtain total scores for a plurality of sections of the electronic media stream;
one or more instructions to identify a particular section, of the plurality of sections of the electronic media stream, having a highest total score of the total scores; and
one or more instructions to select a representative clip for the electronic media stream based on the identified particular section and at least one of information regarding the identified portions of the electronic media stream, information regarding the data associated with user interaction with the electronic media stream, or information regarding the at least one section, where the selected representative clip includes at least a section of the identified particular section.

31. The computer-readable memory device of claim 30, where the one or more instructions to identify the portion of the electronic media stream include:
one or more instructions to train a model to identify portions of electronic media streams based on attributes of the electronic media streams,
one or more instructions to input the electronic media stream into the model, and
one or more instructions to identify, based on an output of the model, the portions of the electronic media stream.

32. The computer-readable memory device, of claim 31, where the one or more instructions to determine the human recognizable labels include:
one or more instructions to train a model to identify human recognizable labels for portions of electronic media streams based on at least one of attributes of the electronic media streams, feature information associated with the electronic media streams, or information regarding other portions within the electronic media streams,
one or more instructions to input the electronic stream and information regarding the portions into the model, and
one or more instructions to determine, based on an output of the model, the human recognizable labels for the identified portions.

33. The computer-readable memory device of claim 30, further comprising:
one or more instructions to determine human recognizable labels for the portions of the electronic media stream.

34. The computer-readable memory device of claim 30, further comprising:
one or more instructions to classify the user interaction with the electronic media stream via the plurality of media players as positive user actions, negative user actions, or neutral user actions with regard to the electronic media stream, where the gathered data is metadata associated with the plurality of media players; and
one or more instructions to assign scores to the positive user actions, the negative user actions, or the neutral user actions with regard to the electronic media stream,
where the scores assigned to the positive user actions are higher than the scores assigned to the negative user actions and the scores assigned to the neutral user actions.

35. A method performed by one or more server devices, the method comprising:
collecting, by one or more processors associated with the one or more server devices, information associated with user interaction with a video stream while playing the video stream via a plurality of video players;
classifying, by one or more processors associated with the one or more server devices, the user interaction as at least two of positive user actions, negative user actions, or neutral user actions with regard to the video stream;
generating scores for labels associated with portions of the video stream, where a score, for a particular label associated with a particular one of the portions of the video stream, is indicative of a probability that the particular label is an actual label for the particular one of the portions; and
identifying, by one or more processors associated with the one or more server devices, a representative clip for the video stream based on the particular label and the at least two of positive user actions, negative user actions, or neutral user actions with regard to the video stream.

36. The method of claim 35, where the at least two of positive user actions, negative user actions, or neutral user actions include the positive user actions, the positive user actions including at least one of turning up a volume during playing of the video stream or replaying part of the video stream.

37. The method of claim 35, where the at least two of positive user actions, negative user actions, or neutral user actions include the negative user actions, the negative user actions including hovering over a fast forward button of a media player playing the video stream and at least one of fast forwarding the video stream or turning down a volume during playing of the video stream.

38. The method of claim 35, where the at least two of positive user actions, negative user actions, or neutral user actions include the neutral user actions, the neutral user actions including at least one of pausing playing of the video stream or muting audio during playing of the video stream.

39. The method of claim 35, where the collected information identifies a user action and when the user action occurred.

40. The method of claim 35, where the video players are associated with a single video player provider.

41. The method of claim 35, where the video players are associated with a plurality of video player providers that are unaffiliated with each other.

42. The method of claim 35, where collecting the information associated with user interaction with regard to the video stream includes:
   obtaining the information from a video player provider associated with the video players.

43. The method of claim 35, where collecting the information associated with user interaction with regard to the video stream includes:
   obtaining the information from software installed on client devices via which the video stream is played.

44. The method of claim 35, where identifying the representative clip for the video stream includes:
   assigning a score to each one of a plurality of parts of the video stream based on the at least two of positive user actions, negative user actions, or neutral user actions that are associated with the one of the plurality of parts of the video stream, and
   selecting a particular part of the plurality of parts of the video stream based on the score assigned to the particular part.

* * * * *